310-334 SR 6 SEARCH ROOM
XR 3,271,644
[redacted] X 87213

Sept. 6, 1966 SUBSTITUTE FOR MISSING XR
J. L. McSHANE 3,271,644
POWER OSCILLATOR FOR AN ELECTROMECHANICAL VIBRATING TRANSDUCER
Filed Oct. 23, 1963
3 Sheets-Sheet 1

WITNESSES:
John G. Chopp
Leon M. Garmon

INVENTOR
James L. McShane
BY Ernest P. Klipfel
ATTORNEY

Sept. 6, 1966 J. L. McSHANE 3,271,644

POWER OSCILLATOR FOR AN ELECTROMECHANICAL VIBRATING TRANSDUCER

Filed Oct. 23, 1963

3 Sheets-Sheet 2

United States Patent Office 3,271,644

Patented Sept. 6, 1966

3,271,644
POWER OSCILLATOR FOR AN ELECTROMECHANICAL VIBRATING TRANSDUCER

James L. McShane, Churchill, Pa., assignor to Westinghouse Electric Corporation, Pittsburgh, Pa., a corporation of Pennsylvania Filed Oct. 23, 1963, Ser. No. 318,263

7 Claims. (Cl. 318—114)

The present invention relates generally to power oscillator circuits and more particularly to an ultrasonic generator circuit capable of driving an electromechanical transducer at its resonant frequency.

This invention is an improvement over a power supply for an electromechanical vibrating transducer of the type disclosed and claimed in Patent No. 3,129,366 issued April 14, 1964 to Warren C. Fry and assigned to the same assignee. As more fully described therein, the frequency of the power supply is kept sufficiently near the resonant frequency of the loaded transducer to insure consistent optimum system performance.

However, as the sharpness of resonance, or Q, of the electromechanical transducer is increased, such as with solid-stack magnetostrictive transducers, operation near the resonant frequency becomes more and more difficult to obtain. The present invention allows the operating frequency of the power oscillator to more adequately follow changes in the resonant frequency of high Q transducers. In fact, the strength of the resonant frequency following action is approximately proportional to the Q of the transducer.

An object of the present invention is to provide a new and improved power oscillator circuit for driving an electromechanical transducer.

Another object of the present invention is to provide a power oscillator circuit which allows stable resonant frequency operation and accordingly fine tuning about the resonant frequency point.

Another object of the present invention is to provide a power oscillator type circuit for an electromechanical transducer which circuit has highly developed resonant frequency tracking ability.

Another object of the present invention is to provide a power oscillator circuit capable of providing increased power as the frequency deviates from resonance to compensate for decreased transducer efficiency.

Further objects and advantages of the present invention will be readily apparent from the following detailed description, taken in conjunction with the drawing, in which.

Figure 1:
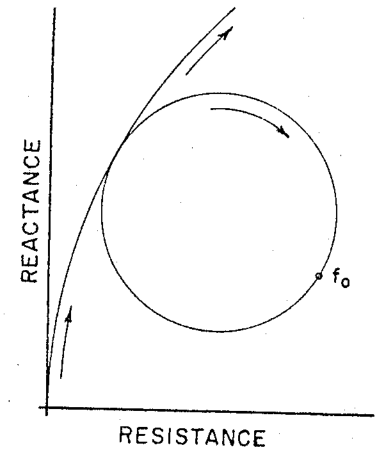
FIGURE 1 is a conventional impedance locus for a magnetrostrictive transducer.

The general form of the impedance locus of a magnetostrictive transducer in the complex impedance plane is shown in FIG. 1. The form has been idealized for purposes of simplicity. It is to be understood that while only one resonant loop has been shown, a number of resonant loops will exist if the acoustic load is such that the total acoustic system has a length equal to several wavelengths at frequencies in the desired range. These loops are spaced apart by predetermined frequency intervals. Usually only one or two loops fall in the desired operating frequency range. The arrows on the curve indicate the direction of increasing frequency. The transducer to be driven is connected to an ultrasonic generator circuit. As the effective resonant length of the load to be driven by the transducer is reduced, for example by a decreasing water level in a cleaning unit with bottom mounted spaced lamination transducer, the resonant loops move upward both in frequency and position in the first quadrant on the graph. Conventionally, the resonant frequency $f_0$ is located in the area perpendicularly opposite to where the frequency curve crosses to form the motional impedance loop. It is in the area around the frequency $f_0$ and the lower part of the loop where the energy coupled into the load is greatest. It is to be noted that at the resonant frequency $f_0$, the resistance component of the transducer impedance is near maximum and the reactance is algebraically decreasing for increasing frequency. That is, the reactance is going in the direction from positive to negative.

The present invention shall provide for the location of the resonant frequency $f_0$ in the minimum resistance area of the resonant loop with the reactance algebraically increasing (going increasingly positive) for increasing frequency. As the following analysis will show, the shape of the phase angle vs. frequency curve of the impedance of the effective A.C. load of the power oscillator circuit, particularly its slope in the vicinity of the resonant frequency, determines whether successful operation at the resonant frequency is possible or not. Prior art circuits resulted in the rate of change of the phase angle being negative or in the unstable region while the present invention results in a positive rate of change of phase angle and accordingly is stable.

Figure 2:
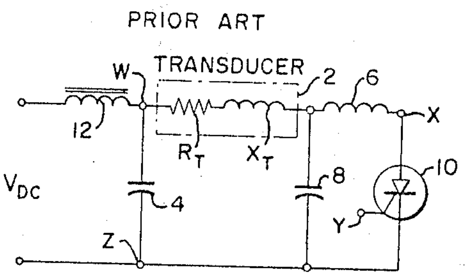
FIG. 2 is an electrical schematic diagram of a prior art power oscillator circuit as a power supply for a transducer.

FIG. 2 shows the basic power oscillator circuit for a transducer 2 as described and claimed in the forementioned copending application. Briefly, the effective A.C. load, including the A.C. portion of the transducer 2 to be driven and a power factor capacitor 4, is connected in circuit combination across an LC circuit made up of inductor 6 and the capacitor 8. Only the A.C. portion of the transducer 2 has been illustrated in the equivalent circuit form. A switch or semiconductor device herein illustrated as a silicon controlled rectifier 10 is connected in the LC circuit to control the interchange of energy between the capacitor 8 and inductance 6. A constant current source is provided to energize the circuit and is simply illustrated as a direct current voltage supply and a large blocking choke 12.

To follow one cycle of operation, assume the following initial conditions: a constant current is flowing in the large blocking choke 12, the capacitor 8 with a zero charge and the controlled rectifier 10 in its blocking mode. The constant current will cause the capacitor 8 to charge thus supplying a positive (forward) voltage to the controlled rectifier 10. When the voltage across the capacitor 8 reaches a certain value, a trigger pulse is applied to the controlled rectifier 10 causing it to go into conduction. Capacitor 8 will now discharge through inductor 6. The voltage across capacitor 8 reaches zero when the current through the inductor 6 is at a maximum. The inductor 6 will continue to cause current to flow until the flux created by the current has collapsed. This resonant discharge current exceeds the constant current flowing from the power supply; and therefore, the capacitor 8 will be charged in the reverse direction. Since the controlled rectifier 10 cannot conduct in the reverse direction, the voltage across the capacitor 8 appears across the controlled rectifier. The capacitor 8 begins to charge up in the positive direction, or, stated in another, the reverse-charged capacitor 8 discharges at constant current through the power supply, then charges again as it did initially, beginning a new cycle. The result is the appearance of a voltage of essentially sinewave configuration across the transducer 2.

Figure 3:
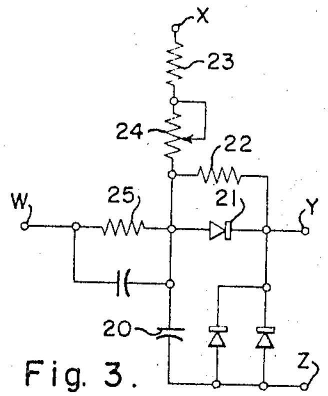
FIG. 3 is an electrical schematic diagram for a trigger circuit used with the power oscillator circuit shown in FIG. 2.

In order to fire the silicon controlled rectifier 10 at the desired time, a trigger circuit as shown in FIG. 3 is connected to the basic power oscillator circuit of FIG. 2. For purposes of clarity, the trigger circuit has been separately shown. Connection into the power oscillator is accomplished by joining the electrical reference points W, X, Y and Z to their respective counterparts shown to be the same points in both FIGS. 2 and 3 for ease of identification.

The trigger circuit is more fully described and claimed in the aforementioned copending application. Suffice for these purposes, the voltage across the controlled rectifier 10 and the voltage appearing across the power factor capacitor 4 are summed across capacitor 20 and supplied to the electrode of the silicon controlled rectifier 10 by means of the rectifier 21 and resistor 22. From FIG. 2, the voltage across the capacitor 8 is the same voltage appearing across the effective A.C. load impedance shown as the transducer-capacitor combination 2, 4. The voltage across the power factor capacitor 4 lags the voltage across the capacitor 8 by an angle, $\phi$. The triggering voltage signal across the summing capacitor 20 has a constant phase relationship with the voltage across the power factor capacitor 4 for any particular setting of the tuning control resistor 24 and a given value of resistors 23, 25, and summing capacitor 20.

Using the triggering circuit of FIG. 3 with the power oscillator circuit of FIG. 2, the operating frequency $$f_g=\frac{1-\frac{(\phi+K)}{360}}{T_o} \qquad (1)$$

where K equals a constant phase angle in degrees dependent on turning control setting of the variable resistor 24. $T_o$ equals a constant conduction time in milliseconds equal to one-half the period of oscillation of inductor 6 and capacitor 8, and $\phi$ is the phase angle at which the voltage across the capacitor 4 lags the voltage across the capacitor 8. The phase angle $\phi$ can also be shown to be equal to $\alpha+90°$ where $\alpha$ is the phase angle of the effective A.C. load impedance which is the impedance of the transducer 2 and the power factor capacitor 4 in series, or $$\alpha=\frac{180}{\pi}\tan^{-1}\frac{X_T+X_C}{R_T}\text{ (degrees)}$$

where $X_T$ is the reactive part of the transducer 2 impedance; $X_C$ is the reactance of the power factor capacitor 4; and $R_T$ is the resistive part of the transducer impedance. $X_T$, $X_C$ and $R_T$ are all functions of frequency. Thus $$\phi=90+\frac{180}{\pi}\tan^{-1}\frac{X_T+X_C}{R_T} \qquad (2)$$

Changes in $\phi$ over the frequency range of interest are almost entirely due to changes in $X_T$ and $R_T$ since $X_C$ is essentially constant over a small frequency range. It can further be concluded that changes in $\phi$ are equal to changes in $\alpha$, the phase angle of the effective A.C. load impedance, since $\phi$ and $\alpha$ differ by a constant.

For a given value of K, that is, a given setting of the tuning control 24, operating frequency is a function of the phase angle $\phi$ only and $$\frac{df_g}{d\phi}=-\frac{1}{360T_o}$$

Thus the locus of possible operating points is a straight line in the phase frequency plane having a slope given by $$\frac{d\phi}{df_g}=-360T_o$$

Figure 4:
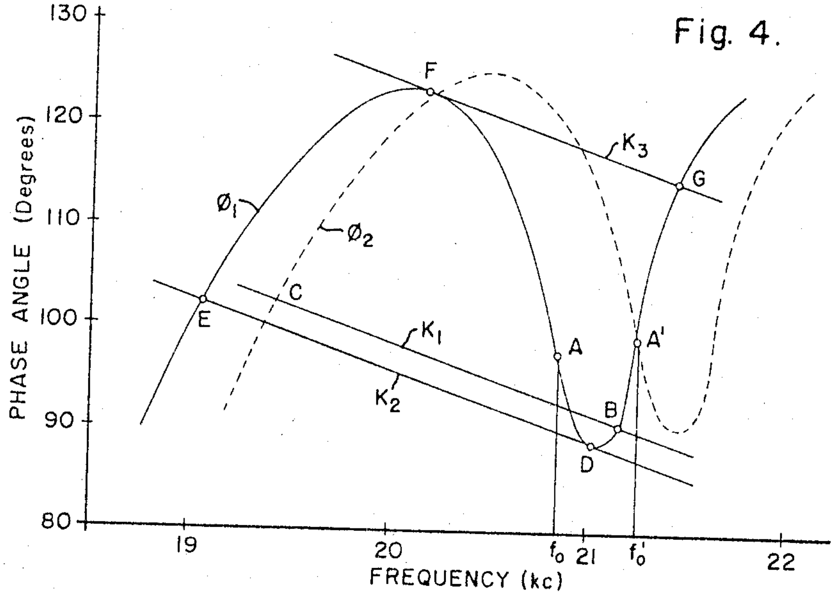
FIG. 4 is a characteristic frequency curve helpful in understanding the operation of prior art power oscillator circuits.

In FIG. 4, the loci for several values of K ($K_1$, $K_2$ and $K_3$) are shown. Assume the phase angle of the transducer impedance and power factor capacitor reactance in series circuit combination to be $\alpha_1$. The solid curve labeled $\phi_1$ is a plot of $\alpha_1$ plus 90° as a function of frequency. Since $\phi_1$ is a function of the frequency $f$ applied to the effective A.C. load consisting of the combination of capacitor 4 and transducer 2, when this combination is connected in the circuit, the applied frequency is the generator operating frequency, that is $f=f_g$. Thus the operating point must satisfy Equation 1 and also Equation 2 both of which relate $\phi$ and $f$. Graphically, Equation 1 is represented by a straight line labeled according to K value and Equation 2 is represented by the curves labeled $\phi_1$, $\phi_2$, etc. The operating points are therefore the intersections of the K lines with the $\phi$ curves. The slope of the K lines is as determined previously with a typical value of the conducting time for an operating frequency near 20 kc. chosen to be $T_o=0.0195$ millisecond so that the slope is $-7°$ per kilocycle. A typical range of frequency operation has been shown. Assume further that the desired operating point is A, corresponding to the resonant frequency $f_o$.

Let the operating point be point B in FIG. 4, which means $K=K_1$. Point B is above the resonant frequency $f_o$. An upward shift in resonant frequency from $f_o$ to $f_o'$, caused by a change in the acoustic load, is indicated by the dashed curve $\phi_2$. Since the constant K has not been changed, the new operating point is the intersection of the $K_1$ line with the $\phi_2$ curve, which unfortunately occurs at point C far removed from the new resonant frequency $f_o'$. Thus, the operating frequency approaches the resonant frequency, but nevertheless jumps from a point above the resonant frequency to a point below the resonant frequency as the resonant frequency is increased.

Resonant frequency avoidance occurs when manual tuning is employed in the same manner as when resonant frequency changes. The manual tuning control provided by variable resistor 24 in FIG. 3 changes the value of K. Assume point A on the $\phi_1$ curve to be the desired operating point. Let $K=K_1$ with the operating point at point B. If K is decreased from $K_1$ to $K_2$, the operating point moves to D, then jumps to E. If K is now increased in an attempt to tune to A from the low frequency side, the operating point will move to F when $K=K_3$, then jump to point G. Accordingly, it can be seen that the region on the $\phi_1$ curve from F to D is unstable and inaccessible. It is possible that the operating frequency can come close enough to the desired resonant frequency to still provide satisfactory operation for heavily loaded, low Q transducers, but as the sharpness of resonance of the transducer Q, is increased, deviation of the operating frequency from the resonant frequency may result in practically no useful acoustic output.

Figure 5:
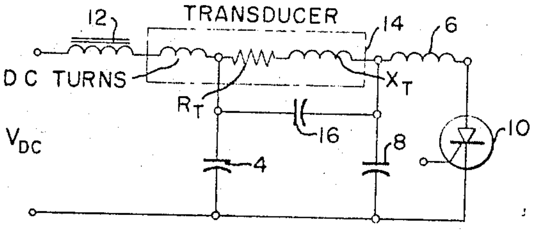
FIG. 5 is an electrical schematic diagram of an illustrative embodiment of the present invention.

In accordance with the present invention, recognition is made of the fact that the desired resonant frequency $f_o$ is located by the prior art at a point on the negative slope of the phase angle $\phi$ vs. frequency curve which gives rise to the aforementioned unstable operation. It has been found that stable operation can be obtained by inverting the transducer phase characteristics near the resonant frequency. Accordingly, a capacitor 16 of predetermined magnitude is connected in circuit combination with the transducer 2 to form a combined impedance member illustrated in FIG. 5. From that figure, it can be seen that the basic oscillator circuit has been changed by modifying the impedance characteristics of the effective A.C. load seen by the generator. Like components have been assigned identical reference characters for purposes of clarity between FIGS. 2 and 5. The transducer however is illustrated with an electrical tap connection disposed between the ends of the transducer and accordingly the transducer has been identified by the reference character 14. The modifying capacitor 16 is shown connected across only part of the transducer winding but all the A.C. turns to reduce the impedance magnitude which is often too large if the A.C. and D.C. turns are the same. Once again, the A.C. portion of the transducer 14 has been illustrated in the equivalent circuit form. The other part of the winding is in the D.C. branch of the circuit, thus keeping polarization ampere-turns unchanged, since direct current is constant for a given output power level.

Figure 6A:
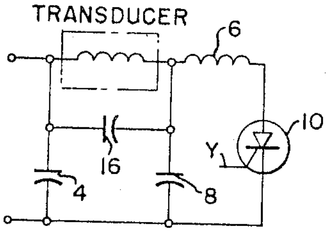
FIG. 6A through FIG. 6F are electrical schematic diagrams of alternate embodiments.
Figure 6B:
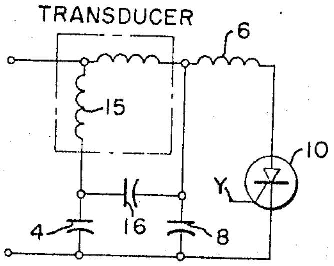
Figure 6C:
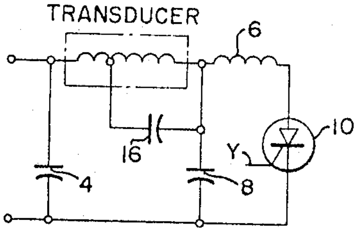

The modifying capacitor 16 is usually connected across the A.C. turns of the transducer 14. It is to be understood however that the circuit parameters of the transducer 14 and capacitor 16 can be selected so that the modifying capacitor 16 is connected across all the turns of the transducer 14 when the total turns are for D.C. as well as A.C. as shown in FIG. 6A. If the A.C. turns must be increased but the D.C. turns are correct, then additional A.C. turns 15 must be provided as illustrated in FIG. 6B. The modifying capacitor 16 can be connected across only part of the A.C. turns as in FIG. 6C. Transformer action, though imperfect, will cause the effect to be almost the same as if the capacitor 16 were connected across all the A.C. turns. In this instance a different capacitance is required because of the impedance transformation.

Figure 7:
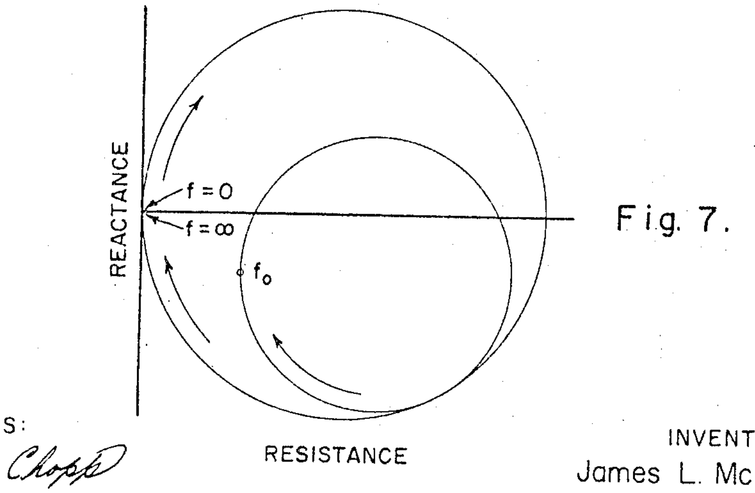
FIG. 7 is an impedance locus for a transducer modified in accordance with the present invention.

The selection of the correct amount of capacitance in parallel with the transducer will effectively change the shape of the $\phi_1$ curve to place the resonant frequency point on the positive rate of change portion of the phase angle curve. FIG. 7 illustrates the impedance locus for the transducer 14 and modifying capacitor 16. The resonant frequency point, marked $f_o$, is located in the minimum resistance area of the motional impedance loop of the electrical impedance locus. The resonant frequency $f_o$ has been located at the minimum value of resistance although it is to be understood that location of the resonant frequency point may be anywhere in the minimum resistance area. In addition, the resonant frequency point $f_o$ is in the area of algebraically increasing reactance for increasing frequency. That is, the reactance is going positive for increasing frequency. Of most importance is that the rate of change of phase angle of the effective A.C. load with frequency and hence of $\phi$ at the resonant frequency has been reversed. That is, the rate of change of phase angle between the voltage across capacitor 8 and capacitor 4 is positive with frequency. The resulting reversal of the rate of change of phase angle places the resonant frequency point on a stable portion of the phase angle curve.

Figure 8:
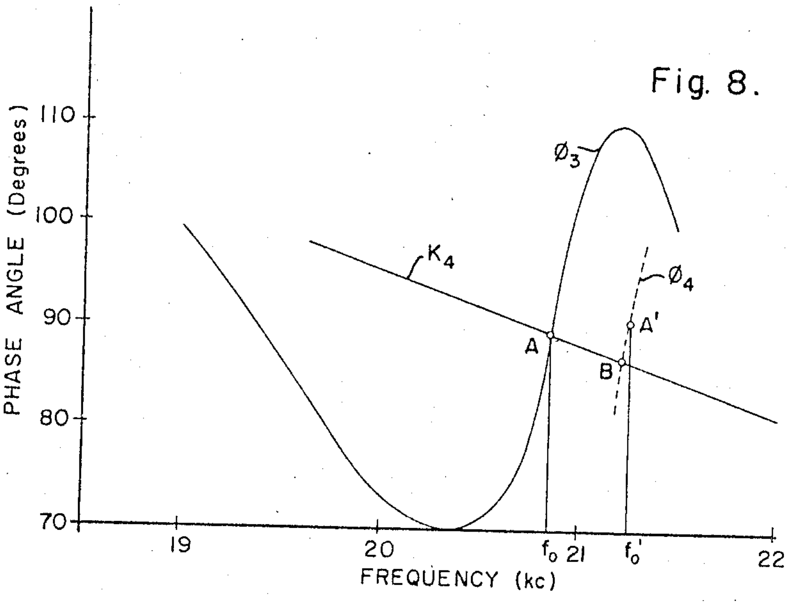
FIG. 8 is a characteristic frequency curve useful in explaining the operation of a power oscillator of the present invention for an electromechanical transducer.
Figure 6D:
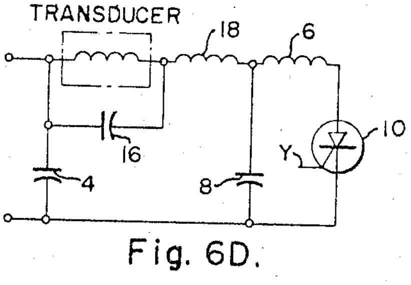

It is apparent from FIG. 7 that the addition of the impedance of the power factor capacitor 4 would move the resonant frequency point, denoted by $f_o$, further capacitive. To raise the center of the locus to the region of zero phase angle position, that is, to correct the power factor of the effective A.C. load across capacitor 8, it is sufficient to merely add a series inductive reactance in the form of inductor 18 to the impedance of the transducer 14 and modifying capacitor 16 shown in FIG. 6D. As in the case of series capacitors, series inductors add essentially constant reactance in the frequency range of interest, thus shifting the impedance curves up or down without changing their shape appreciably. Referring to FIG. 8, the phase angle $\phi_3=\alpha_3+90°$ for the combination shown in FIG. 6D is illustrated. The effect of the modifying capacitor 16 on operation at the resonant frequency can be illustrated by once again tuning the variable resistor 24 to provide a constant $K=K_4$. The resonant frequency point is again identified as point A. Operation at the resonant frequency, point A, or in its vicinity, is now not only stable but non-critical to changes in K thus providing fine tuning. If it is assumed that a resonant frequency change from $f_o$ to $f_o'$ shifts the phase angle curve as in FIG. 8 to $\phi_4$, the operating point would shift to point B, whereas the new resonant frequency is at A'. Tracing the initial setting of the tuning control as exemplified by the locus of $K_4$, it can be seen that the operating frequency changes approximately 92% of the desired change based on that specific transducer. The circuit has a strong tendency to remain at the resonant frequency even though resonant frequency changes. Automatic frequency tracking is thus provided but it now applies in an area which includes the resonant frequency.

While the present invention has been illustrated in a cleaning tank embodiment, its application can be made to transducer supplies for welding, drilling, cutting, metal treatment and others with equal or better results. The present invention pertains equally well to solid stack (generally high Q) and spaced lamination (generally low Q) transducers as far as frequency characteristics are concerned. The chief difference between high Q and low Q transducers is that the frequency range over which the phase change near resonance occurs is smaller or larger respectively. The magnitude of the phase changes may also be different. The tracking ability is approximately proportional to the motional Q of the transducer in that the steepness of the positive sloping portion of the curve $\phi_3$ in FIG. 8 increases with increasing Q.

While the present invention has been described with reference to the problem of resonant frequency avoidance in a power oscillator circuit utilizing a silicon controlled rectifier, it is to be understood that the problem also exists in LC tuned power oscillators using vacuum tubes or transistors as active elements. It appears to be a basic characteristic of oscillator circuits driving resonant loads. The benefits provided by the present invention in modifying the transducer impedance are the same for the power oscillator and the SCR generator circuit.

Figure 6E:
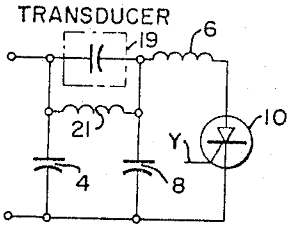
Figure 6F:
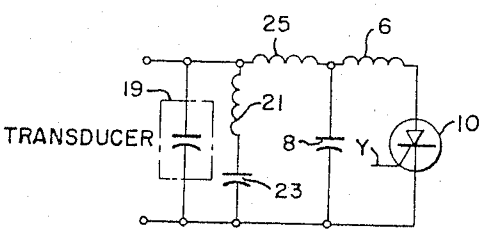

The present invention is equally applicable to electrostrictive transducers. In such instance the transducer impedance locus of FIG. 1 would be placed in the fourth quadrant rather than the first quadrant as illustrated and the impedance locus of the transducer and modifying reactance member would also be shifted to the other quadrant. Operation of the electrostrictive transducer at its resonant frequency is accomplished by using a parallel inductance member since the electrostrictive transducer has the same type of impedance characteristic as the magnetostrictive unit, except that it is capacitive rather than inductive. For example, an electrostrictive transducer 19 may be connected in the power oscillator circuit as shown in FIG. 6E with an inductance member 21 connected thereacross which will modify the impedance and act as a D.C. by-pass choke at the same time. Or, the electrostrictive transducer 19 may be connected as shown in FIG. 6F with the inductance member 21 connected in series with a blocking capacitor 23 across the transducer 19. An inductor 25 completes the A.C. series connection across the LC circuit of inductor 6 and capacitor 8. Accordingly, the modifying capacitor 16 or modifying inductor as the case may be has been identified as broadly a reactance member which as explained previously will be of opposite kind to the reactive member of the transducer that is used, be it either magnetostrictive or electrostrictive.

Since the resonant frequency point has been located in the minimum resistance area of the modified impedance locus shown in FIG. 7, and since increasing the resistance of the modified impedance increases power oscillator output, the power oscillator circuit will put out gradually increasing power to the transducer if the operating frequency deviates from the resonant frequency. Thus, if some excess power capacity is reserved above that required for resonant frequency operation, the increased power off resonance will tend to compensate for decreased transducer efficiency.

While the present invention has been described with a degree of particularity for the purposes of illustration, it is to be understood that all modifications, alterations and improvements within the spirit and scope of the present invention are herein meant to be included. The best value of the reactance member connected in circuit combination with the transducer to modify the impedance locus is that value which shifts the resonant frequency point to a minimum resistance point as shown in FIG. 7. This places the resonant point roughly at the midpoint of the positively sloping portion of the phase angle curve ($\phi_3$ on FIG. 8), and allows for resonant frequency shifts in either direction. However, it is readily apparent that the desired effects may be achieved with more or less capacitance in the case of a magnetostrictive transducer or inductance in the case of an electrostrictive transducer since stable operation is possible if the resonant frequency point is anywhere on the positively sloping portion of the phase-frequency curve, and since it is well known that adequate operation can be obtained by operation of the transducer at least in the area close to the resonant frequency point.

I claim as my invention:

1. In a power oscillator circuit for an electroacoustical transducer having an impedance functionally related to the load to be driven; an LC circuit; means for energizing said LC circuit; means for controlling energy transfer within said LC circuit; and an effective A.C. load impedance leg including said transducer connected across said LC circuit and having an impedance which has a minimized resistance and algebraically increasing reactance with frequency at the resonant frequency as determined by the load to be driven.

2. In combination, an electroacoustical transducer having a resonant frequency related to the load to be driven thereby; a constant current source; an LC circuit operably connected to said constant current source; means for operably connecting said transducer to load said LC circuit; means responsive to the resonant frequency of said transducer for controlling the frequency at which energy is interchanged in said LC circuit; the improvement comprising the combining of a reactance member with said transducer but of the opposite impedance kind to that of said transducer and chosen to be of a magnitude such that the resulting load impedance from the combination has a characteristic curve wherein the resonant frequency of said loaded transducer is located in the area of the motional impedance loop of minimum resistance and algebraically increasing reactance with frequency.

3. In combination, an electroacoustical transducer having a resonant frequency related to the load to be driven thereby; an LC circuit including a capacitor member and an inductor member; a constant current source for energizing said LC circuit; a power factor capacitor; means for connecting said transducer and power factor capacitor in circuit combination across said LC circuit; switching means responsive to the voltage across said power factor capacitor for controlling the frequency at which energy is interchanged in said LC circuit; and a reactance member connected in circuit combination with said transducer to provide a positive rate of change of phase angle between the voltage across the capacitor member and the voltage across the power factor capacitor.

4. The apparatus of claim 3 wherein an inductance element is inserted in series circuit combination with the transducer and power factor capacitor with their capacitive and inductive reactances so proportioned and arranged that the combined reactance of said series inductance element, transducer, reactance member and power factor capacitor results in the center of the impedance locus of the series circuit to be located in the area of zero phase angle position with the resistance of such combination located in a minimum area at the resonant frequency.

5. In combination, a transducer having D.C. windings and A.C. windings and having electrical characteristics functionally related to the load to be driven thereby; an LC circuit including a capacitor member and an inductor member; a constant current source operably connected across said LC circuit; means responsive to the electrical characteristics of said transducer for controlling the frequency at which energy is interchanged in said LC circuit; an effective A.C. load impedance branch including a first capacitor and a second capacitor connected in circuit relation with the A.C. turns of said transducer across said LC circuit; said first capacitor connected in series circuit combination with said A.C. turns; and said second capacitor connected across at least part of said A.C. turns; the reactance of said load impedance branch having a magnitude so chosen that the phase angle between the voltage across said capacitor member and the voltage across said power factor capacitor is at a positive rate of change with respect to frequency at the resonant frequency of said transducer.

6. In combination, an electroacoustical transducer having a resonant frequency related to the load to be driven thereby; an LC circuit; means for connecting said LC circuit to a constant current source; a first capacitor; an effective A.C. load impedance including said transducer and said first capacitor in series circuit relation connected to said LC circuit; means responsive to the voltage across said first capacitor for controlling the frequency at which energy is interchanged by said LC circuit; the improvement comprising a second capacitor connected across at least a portion of said transducer and chosen to be of such a magnitude that the phase angle of the voltage across said first capacitor has a positive rate of change with frequency at the resonant frequency of said transducer.

7. In combination, an electroacoustical transducer having a reactive member of predetermined kind and a resonant frequency related to the load to be driven thereby; an LC circuit; means for connecting said LC circuit to a constant current source; a first reactance member of opposite kind; an effective A.C. load impedance including said reactive member and said reactance member connected in circuit combination to said LC circuit; means responsive to the voltage across said reactance member for controlling the frequency at which energy is interchanged by said LC circuit; the improvement comprising a second reactance member of opposite kind connected across at least a portion of only said reactive member and chosen to be of such a magnitude that the voltage across the first reactance member lags the voltage across the capacitor of said LC circuit with a phase angle having a positive rate of change with frequency at the resonant frequency of said transducer.

References Cited by the Examiner

UNITED STATES PATENTS

| | | | |
|---|---|---|---|
| 2,872,578 | 2/1959 | Kaplan et al. | 318—118 X |
| 3,129,366 | 4/1964 | Fry | 318—114 |
| 3,151,284 | 9/1964 | Kleesattel | 310—26 X |

FOREIGN PATENTS

| | | |
|---|---|---|
| 957,894 | 5/1964 | Great Britain. |

MILTON O. HIRSHFIELD, *Primary Examiner.*

D. F. DUGGAN, *Assistant Examiner.*